(12) United States Patent
Caganlar

(10) Patent No.: US 11,564,379 B2
(45) Date of Patent: Jan. 31, 2023

(54) DOUBLE PIPE CULTIVATION SYSTEM FOR REDUCING LOSSES OCCURRING DUE TO WIND, WAVE AND TIDE IN MUSSEL CULTIVATION FARMS

(71) Applicant: Caglar Caganlar, Ankara (AR)

(72) Inventor: Caglar Caganlar, Ankara (AR)

( * ) Notice: Subject to any disclaimer, the term of this patent is extended or adjusted under 35 U.S.C. 154(b) by 141 days.

(21) Appl. No.: 16/627,343

(22) PCT Filed: Sep. 13, 2018

(86) PCT No.: PCT/TR2018/050487
§ 371 (c)(1),
(2) Date: Dec. 30, 2019

(87) PCT Pub. No.: WO2019/103713
PCT Pub. Date: May 31, 2019

(65) Prior Publication Data
US 2020/0146266 A1    May 14, 2020

(30) Foreign Application Priority Data

Jul. 13, 2017    (TR) .................................. 2017/10289

(51) Int. Cl.
*A01K 61/65*    (2017.01)
*A01K 61/54*    (2017.01)

(52) U.S. Cl.
CPC .............. *A01K 61/65* (2017.01); *A01K 61/54* (2017.01)

(58) Field of Classification Search
CPC ........ A01K 61/50; A01K 61/54; A01K 61/60; A01K 61/65

USPC ................................. 119/204, 207, 208, 213
See application file for complete search history.

(56) References Cited

U.S. PATENT DOCUMENTS

| 6,892,672 | B2 * | 5/2005 | Klein | A01K 61/60 119/223 |
|---|---|---|---|---|
| 7,341,021 | B2 * | 3/2008 | Cortinas | A01K 61/54 119/239 |
| 7,650,856 | B2 * | 1/2010 | Quinta | A01K 61/54 119/223 |
| 8,092,679 | B1 * | 1/2012 | Jensen | C02F 3/327 210/602 |
| 10,051,844 | B2 * | 8/2018 | Newell | B63B 35/00 |
| 10,932,452 | B2 * | 3/2021 | Leslie | A01K 61/60 |
| 2006/0037551 | A1 | 2/2006 | Ouinta | |
| 2013/0186345 | A1 | 7/2013 | Leslie | |

FOREIGN PATENT DOCUMENTS

| BG | 63741 B1 * | 11/2002 |
| CN | 101438684 A | 5/2009 |
| ES | 1043285 U | 12/1999 |
| WO | 2005067706 A2 | 7/2005 |
| WO | 2009009838 A1 | 1/2009 |

* cited by examiner

*Primary Examiner* — Brady W Frazier
(74) *Attorney, Agent, or Firm* — Bayramoglu Law Offices LLC

(57) ABSTRACT

A double pipe cultivation system which enables the reduction of falling the mussels cultivated with the effect of vertical and horizontal forces that would occur due to wind, wave and tides that can be received in all directions in mussel farms established in sea and lake areas, and the losses that can occur due to similar reasons.

7 Claims, 4 Drawing Sheets

DOUBLE PIPE CULTIVATION SYSTEM FOR REDUCING LOSSES OCCURRING DUE TO WIND, WAVE AND TIDE IN MUSSEL CULTIVATION FARMS

CROSS REFERENCE TO THE RELATED APPLICATIONS

This application is the national phase entry of the International Application No. PCT/TR2018/050487, filed on Sep. 13, 2018, which is based upon and claims priority to Turkish Patent Application No. 2017/10289, filed on Jul. 13, 2017, the entire contents of which are incorporated herein by reference.

TECHNICAL FIELD

Present invention relates to a double pipe cultivation system which allows to reduce the falling of the mussels cultivated with the effect of vertical and horizontal forces that will occur due to wind, wave and tides that can be received from all directions in mussel farms mantled over sea and lake surface, and to prevent the losses that can occur.

BACKGROUND

In the current techniques, buoy, main carrier rope on the sea surface, and similar methods are still frequently being used. In such methods, problems of the falling of the cultivated mussels are experienced due to the factors as the oscillation occurring due to wind, wave and tides, the friction between the ropes, continuous movement of the ropes and kinking.

SUMMARY

In our system of the present invention, it is aimed to make the mussel cultivation ropes move minimum in the sea, and thus to reduce the losses that are experienced by decreasing the loads to be generated by the vertical and horizontal forces that will occur due to wind, wave and tides on the main carrier ropes, peripheral ropes, carrier double pipe floaters and mussel cultivation ropes of the mussel farm.

BRIEF DESCRIPTION OF THE DRAWINGS

The double pipe cultivation system for reducing the losses occurring due to wind, wave and tide in mussel cultivation farms developed in order to achieve the objective of the present invention is illustrated in the accompanying drawings, wherein.

Figure 1:
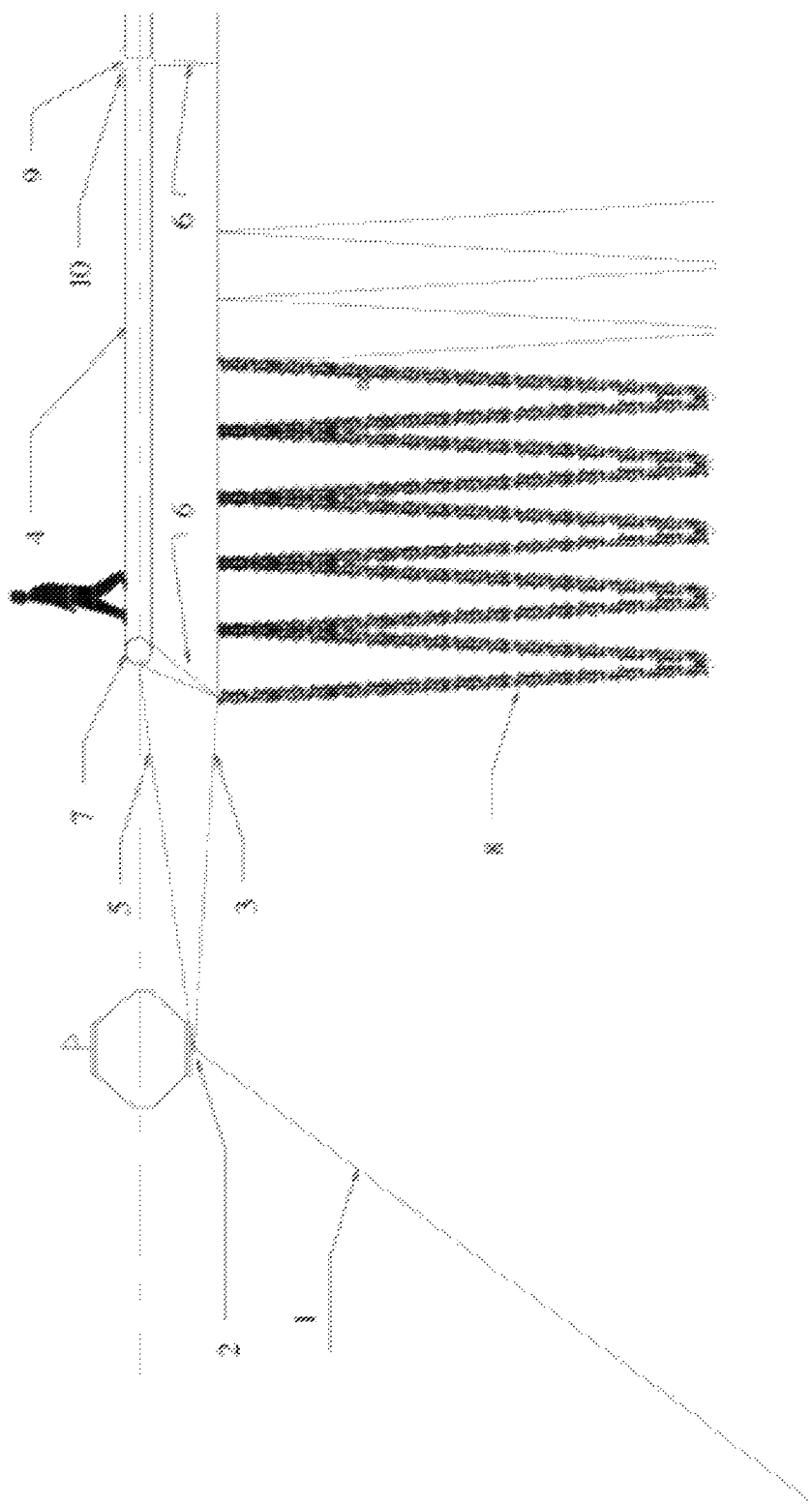
FIG. 1 shows a cross sectional view the connection of the double pipe cultivation system for reducing the losses occurring due to wind, wave and tide in mussel cultivation farms of the present invention.
Figure 2:
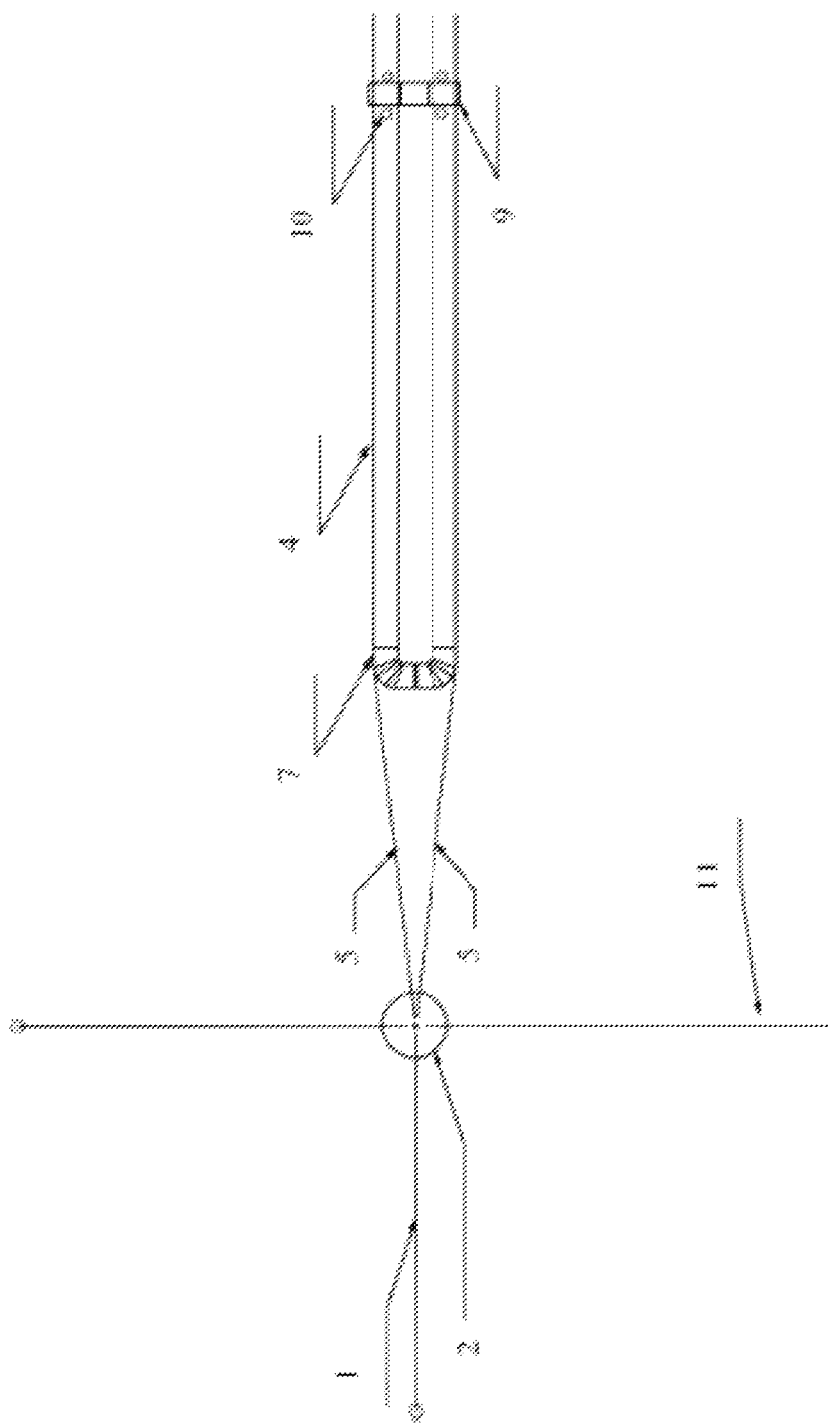
FIG. 2 shows a connection plan view of the double pipe cultivation system for reducing the losses occurring due to wind, wave and tide in mussel cultivation farms of the present invention.
Figure 3:
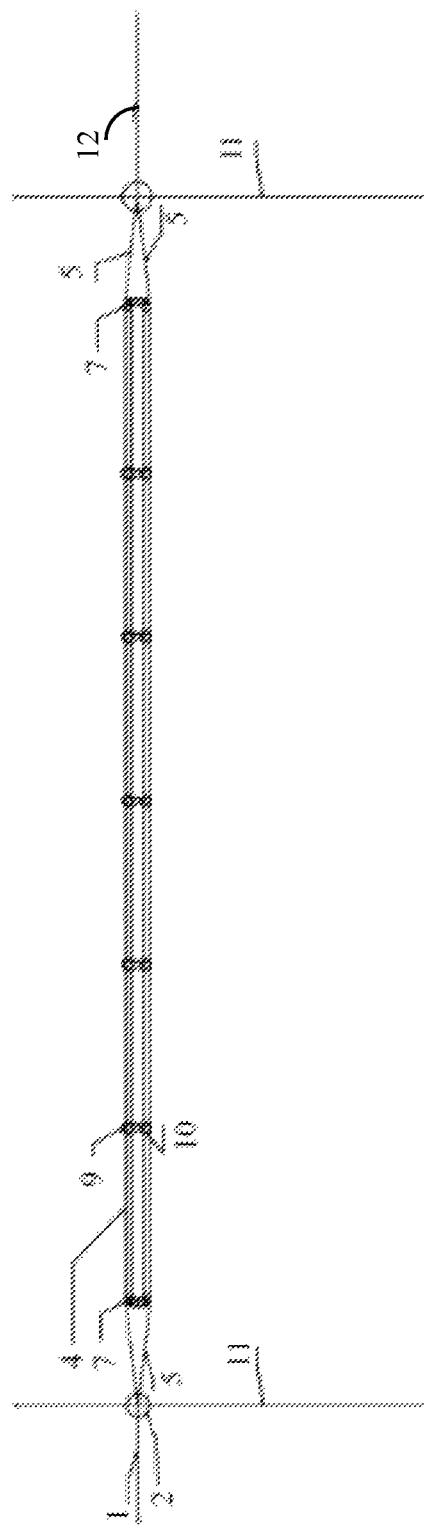
FIG. 3 shows a double pipe plan view of the double pipe cultivation system for reducing the losses occurring due to wind, wave and tide in mussel cultivation farms of the present invention.
Figure 4:
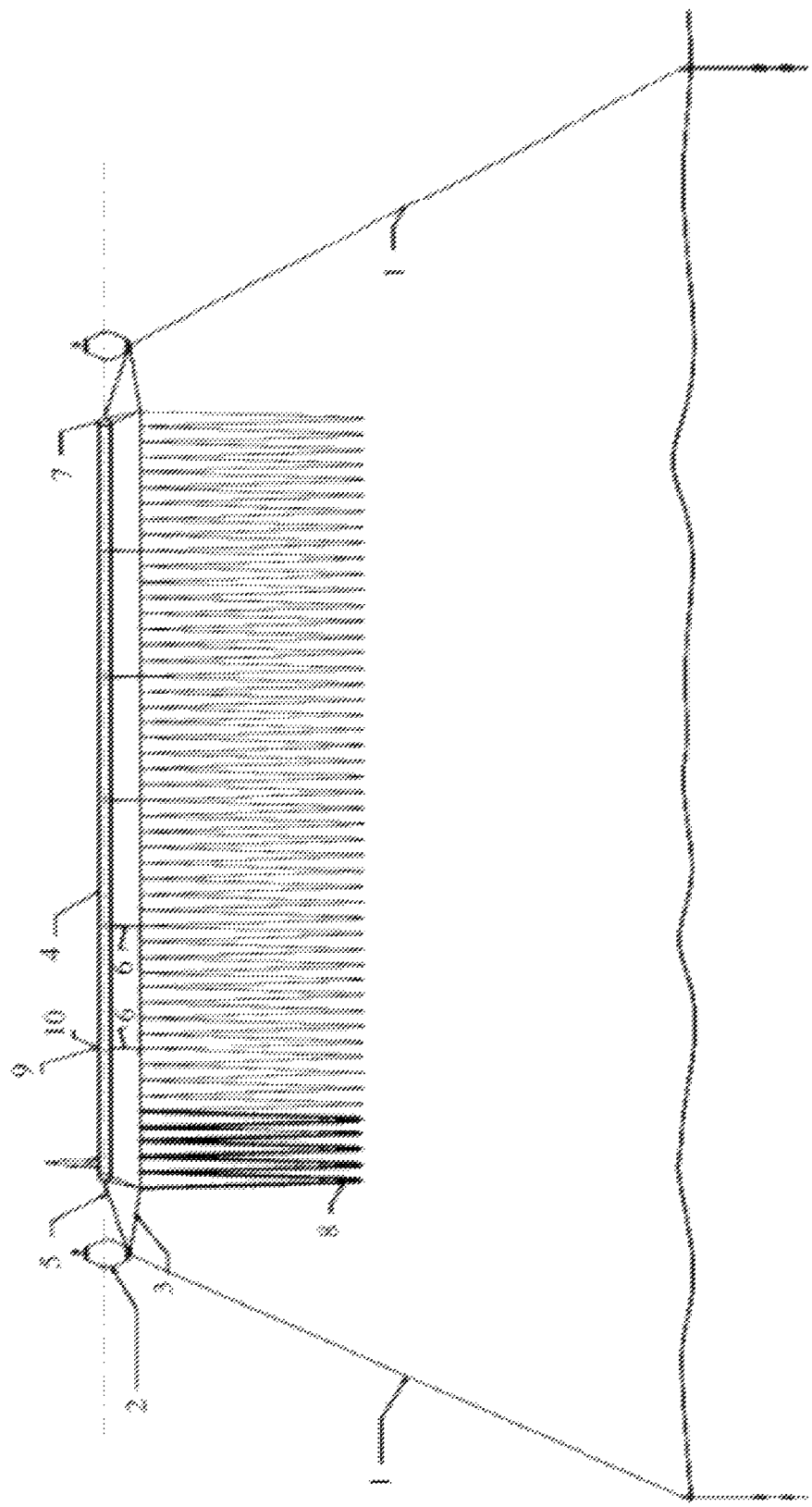
FIG. 4 shows a cross-sectional double pipe view of the double pipe cultivation system for reducing the losses occurring due to wind, wave and tide in mussel cultivation farms of the present invention.

The references from the FIGS.
1. Anchor rope
2. Buoy and collector
3. Main Carrier Rope
4. Double Pipe HDPE Main floater Pipe
5. Guy rope
6. Oscillation Absorbing Guy Rope
7. HDPE Elbow
8. Mussel Cultivation Rope
9. HDPE Pipe Bracket
10. HDPE Stopper
11. Peripheral Rope
12. Additional Anchor Rope

DETAILED DESCRIPTION OF EMBODIMENTS

Anchor rope (1) and additional anchor rope (12) are connected to both main carrier rope (3) and the peripheral rope (11) and the double row HDPE floater pipes (4) by means of collectors on the buoys, or buoy and collectors (2). The rope enables the load generated at one point to be distributed to a plurality of points up-down vertically and to four directions horizontally and transfers the main loads to the seabed. The buoy and collectors (2) reduce the tension coming from the anchor rope (1) and additional anchor rope (12) by means of its lifting/floating ability in water, and also reduce the load in other connections by distributing the incoming loads, being different from the current techniques. The main carrier rope (3) is the rope where the mussel cultivation ropes (8) are hung, below the double pipe HDPE main floater pipe (4). It is connected to the double pipe HDPE main floater pipe (4) by suspension via the oscillation absorbing guy rope (6), and it transfers the loads around itself from all directions by being connected to the buoy and collectors (2) from both ends. Duty of this rope is to transfer the load of the mussel cultivation ropes (8) to the other components of the system.

The double pipe HDPE main floater pipe (4) is an apparatus which has not been used alone in other mussel cultivation farms. It can float quiet high loads on water as it is in fish farms. By means of the polystyrene foam filling therein, its floating ability increases, and it does not sink even there are breaks, cracks and holes since its volume is fully filled in case water escapes therein. Since it provides a longitudinal load bearing area, it floats the load by dividing into unit area, not on single point, contrary to farm models with buoy. It prevents sinking by the downward point load charges (mussel cultivation ropes) (8).

The double pipe HDPE main floater pipe (4), having double pipe prevents the pipe from spinning around themselves in water and the ropes from being tangled. It enables the loads to be distributed to components via total of 4 points by making cross connections from two points (elbow) at the beginning and at the end, and it makes easy to tension the pipes. It provides to install safe working area that allows cultivation and harvesting mussel, and a path to walk on it. It facilitates to control cultivation, harvest and sowing time and all applications over it. It allows to perform examination without diving. Since it is far longer than the wave frequency, and solid against wave height, it is not affected by wave. It does not shake due to the waves. It acts as a carrier and a floater by remaining still in the sea. Since it is connected via the brackets (9) and elbows (7), the load coming onto itself is distributed from every point and reduced and absorbed by means of its flexibility. If the floating ability is desired to be increased, additional floaters can be added between two pipes without contacting the mussel cultivation ropes (8), it can be transported to another sea area without dismantling the system or damaging the mussel cultivation ropes (8). The interval of the pipes can be increased in sea area since it can be floated easily and thus its place can elementarily be changed, allows achieving higher capacity per unit volume by placing condensed pipes in limited sea areas.

Since the bracket (9) connections thereon are not welded to the pipes, but their movement is limited by means of the stoppers (10); the main floater pipes (4) do not separate from each other, but they can flex and distribute the load. Since the pipes are round and have less wind resisting surface, there will be no movement due to the wind. Its double pipe structure and other rope and connection design allows remaining amount of wind load to disappear within the farm settlement.

The guy rope (5) is the rope where the HDPE pipes (4) are connected to the peripheral rope (11) and distribute the load. While it is only used to keep the peripheral rope (11) and the buoy and collectors (2) together in other farm models, in our system it evenly distributes the generated load by sharing with each component and it creates flexibility inside the entire farm structure by tensioning or loosening between the double pipe HDPE main floater and the buoy and collector. They support to serve out the generated loads to other connections. Furthermore, they dispatch the load on the mussel cultivation ropes (8) to other components via buoy and collectors (2).

The guy ropes (5) also reduce the spaces occurring due to the tide inside the whole structure and prevent the farm structure to become loose completely.

Different than the other farm models, the oscillation absorbing guy rope (6) allows the main carrier rope (3) in which receives the mussel cultivation ropes (8); are connected to be placed downwards to dangle from the sea level in the height of the average wave length depending on the sea wave statistics.

In other farm models, the mussel cultivation ropes (8) are made at almost the same level as the sea level, and they are directly connected to the pipes or buoys without using the stated guy rope (6). For this reason, all movement occurring on the surface also moves the mussel cultivation ropes (8) at all directions. By this means, it allows the wave movement above to be transferred below to the mussel ropes (8) after being absorbed and even allows remaining still with all loads absorbed via the guy ropes (5). The oscillation absorbing guy rope (6) is overspread on the pipes or brackets (9) where suitable from two points like a noose. It is not fixed to the pipes. Therefore, when a tension occurs, it transfers by distributing since it is connected flexibly from two points.

HDPE elbow (7) is used a strong connector in connection of double row HDPE main floater pipes (4) and in connection of the guy ropes (6). Since the guy ropes (6) can rotate and change place on the elbow, they transfer the loads in the most required position by distributing. Its design allows to be self-positioning against any wind direction.

The mussel cultivation rope (8) is connected to the main carrier rope (3) in V form or shape, and it transfers its own load to the main carrier rope (3), and it allows splitting the load of even a pinch of small shakes evenly by two connection point over it.

Two rows of HDPE main floater pipes (4) connected to each other from the beginning and the end via the HDPE elbows (7) are connected to each other via the HDPE pipe brackets (9) is to fix with certain intervals all along the whole row, to maintain the intervals, and to keep the pipes together without limiting the back and forth movement flexibility. HDPE pipe bracket (9) is slightly larger than the diameter of the pipe, and it is not tightened to the pipe.

HDPE stopper (10) is the stoppers to limit the flexibility of the pipes provided by the HDPE pipe brackets (9). By means of these, the brackets (9) can move as much as the distance set around the connection point where they are installed. They only allow pipes to achieve designated position where they can reduce or absorb the loads by moving a certain amount, the movements more than this and the breaking due to excessive tension are avoided by stopper (10). In this way, the load on them is reduced and the uniformity of the pipes and lines are not disrupted while distributing the loads, the load tension does not condense to a point and breaks do not occur.

The peripheral rope (11) is used to align the buoy and collectors (2), guy ropes (6) and the main carrier rope (3). This connection also allows transferring of the horizontal loads that may appear to the adjacent row, to the buoy and collectors (2), and to the guy ropes (6) of the next row. By this rope, the load tension is not only transferred to one double row of HDPE main floater pipe (4), but it is transferred to all pipe connections, and the mussel farm structure meets all wave, wind and tide loads as a whole structure.

Since the effect of wind, wave and tide movements on the mussel cultivation ropes (8) are minimized to ignorable levels, thanks to the invention, there will be no factors on the mussel cultivation ropes (8) reducing efficiency, such as fallings, losses, breakings occurring due to movement, friction, tangling, hitting and the like, and deaths due to stress.

In addition, due to mechanical inactivity, the planktons necessary for the growth of mussels can hold in the more stagnant area of the water, settle and reproduce more easily. There are only movements due to water stream; nevertheless the negative effects due to the water stream are not strong enough to move the main carrier rope (3) and the mussel cultivation ropes (8) of the mussel farm.

What is claimed is:

1. A double pipe cultivation system for reducing losses occurring due to wind, wave and tide in mussel cultivation farms, comprising:
  a plurality of anchor ropes, wherein the plurality of anchor ropes enable loads to be transferred to a seabed,
  a buoy and collector, wherein the buoy and collector have buoyancy and floating properties, and wherein the buoy and collector are connected to the plurality of anchor ropes,
  a mussel cultivation rope, wherein the mussel cultivation rope is in a V form,
  a main carrier rope, wherein the main carrier rope is for transferring loads to all components of the double pipe cultivation system, and configured to make a connection between the mussel cultivation rope and the buoy and collector,
  a double pipe HDPE main floater, comprising:
    a double pipe that prevents itself from spinning in water and the mussel cultivation rope from being tangled, wherein the mussel cultivation rope further comprises a polystyrene foam filling,
    HDPE elbows configured to connect the double pipe HDPE main floater pipe to ends of each other,
  a guy rope, wherein the guy rope creates flexibility by the guy rope tensioning or loosening between the double pipe HDPE main floater and the buoy and collector,
  an oscillation absorbing guy rope, wherein the oscillation absorbing guy rope provides connection from the double pipe HDPE main floater and the main carrier rope.

2. The double pipe cultivation system for reducing losses occurring due to wind, wave and tide in mussel cultivation farms according to claim 1, wherein the buoy and collector enable the loads generated at one point to be distributed to a plurality of points.

3. The double pipe cultivation system for reducing losses occurring due to wind, wave and tide in mussel cultivation farms according to claim 1, wherein the guy rope creates flexibility by tensioning or loosening between the double pipe HDPE main floater and the buoy and collector.

4. The double pipe cultivation system for reducing losses occurring due to wind, wave and tide in mussel cultivation farms according to claim 1, wherein the oscillation absorbing guy rope enables wave movements to be absorbed and then transferred to the mussel cultivation rope.

5. The double pipe cultivation system for reducing losses occurring due to wind, wave and tide in mussel cultivation farms according to claim 1, wherein the mussel cultivation rope enables the loads to be divided into two by means of the V form.

6. The double pipe cultivation system for reducing losses occurring due to wind, wave and tide in mussel cultivation farms according to claim 1, wherein the main carrier rope enables the loads generated in the mussel cultivation rope to transfer to other components of the double pipe cultivation system.

7. The double pipe cultivation system for reducing losses occurring due to wind, wave and tide in mussel cultivation farms according to claim 1, wherein the plurality of anchor ropes enable the loads to be transferred to the seabed.

\* \* \* \* \*